United States Patent
Iyer

(10) Patent No.: US 11,587,589 B1
(45) Date of Patent: Feb. 21, 2023

(54) DIRECT CURRENT (DC) LEVEL SHIFTING CIRCUIT FOR USE IN THE DETECTION OF MEDIA DEFECTS WITHIN A MAGNETIC RECORDING MEDIA

(71) Applicant: Western Digital Technologies, Inc., San Jose, CA (US)

(72) Inventor: Vishwanath Iyer, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/576,038

(22) Filed: Jan. 14, 2022

(51) Int. Cl.
G11B 20/18 (2006.01)
G11B 20/10 (2006.01)
G11B 33/10 (2006.01)

(52) U.S. Cl.
CPC .... *G11B 20/1816* (2013.01); *G11B 20/10351* (2013.01); *G11B 33/10* (2013.01)

(58) Field of Classification Search
None
See application file for complete search history.

(56) References Cited

U.S. PATENT DOCUMENTS

| | | | |
|---|---|---|---|
| 5,249,172 A * | 9/1993 | Hagihara | G11B 33/144 369/116 |
| 5,264,804 A | 11/1993 | Fox | |
| 6,222,386 B1 | 4/2001 | Alford et al. | |
| 7,425,719 B2 | 9/2008 | Treves et al. | |
| 2002/0085468 A1 * | 7/2002 | Kobayashi | G11B 7/126 |
| 2002/0181133 A1 | 12/2002 | Koshkina et al. | |
| 2005/0068882 A1 * | 3/2005 | Yamamuro | G11B 7/1263 369/116 |

(Continued)

FOREIGN PATENT DOCUMENTS

EP 2546966 A2 1/2013

OTHER PUBLICATIONS

Karantzalis, Philip; "A precision active filter block with repeatable performance to 10MHz"; ScienceDirect; Analog Circuit Design, vol. 3, 2015; https://www.sciencedirect.com/science/article/pii/B978012800001400466X; 22 pages.

(Continued)

*Primary Examiner* — Peter Vincent Agustin
(74) *Attorney, Agent, or Firm* — Loza & Loza, LLP; Gabriel Fitch

(57) ABSTRACT

Various circuits, systems, methods, and apparatus are disclosed to provide dynamic direct current (DC) level shifting for use with a summing component of a quad channel detector (QCD) of a media scanning system configured to detect carbon voids or other defects on the surface of a magnetic recording medium. In an example, a summing circuit receives separate input signals from four optical sensors of the scanning system and generates a summed output signal with an alternating current (AC) component representative of a defect and a direct current (DC) component representative of a total power of an optical transmitter of the scanning system. A DC level shifting circuit receives a fixed DC offset signal and the same four variable input signals. The DC level shifting circuit provides dynamic level shifting of the DC component of the summed output signal based on the fixed DC offset and the four input signals.

26 Claims, 10 Drawing Sheets

(56) References Cited

U.S. PATENT DOCUMENTS

2009/0002075 A1     1/2009   Chilakapati et al.
2010/0182715 A1*   7/2010   Harmer .................. G11B 21/12
                                                                               360/75
2010/0226033 A1     9/2010   Tan et al.

OTHER PUBLICATIONS

Zhong et al., Abstract of "Investigation of carbon void defects on hard disk surfaces"; Surface Engineering; vol. 21, Issue 1, 2005; https://www.tandfonline.com/doi/abs/10.1179/174329405X30066; 5 pages.
Measurement Computing; "DBK18 4-Channel Low-Pass Filter & Amplifier Card"; Last accessed on Jan. 5, 2022; https://www.mccdaq.com/pdfs/specs/dbk18_data.pdf; 2 pages.
Electrical Engineering; "What is the simplest op amp level shifter?"; Electrical Engineering Stack Exchange; Last accessed on Jan. 5, 2022; https://electronics.stackexchange.com/questions/104150/what-is-the-simplest-op-amp-evel-shifter; 6 pages.

* cited by examiner

DIRECT CURRENT (DC) LEVEL SHIFTING CIRCUIT FOR USE IN THE DETECTION OF MEDIA DEFECTS WITHIN A MAGNETIC RECORDING MEDIA

FIELD

The disclosure relates, in some aspects, to media defect scanning systems for detecting defects in magnetic recording media using an optical test head. More specifically, but not exclusively, the disclosure relates to circuitry for processing signals generated by media scanning systems that may be indicative of defects in the magnetic recording media.

INTRODUCTION

Magnetic storage systems, such as a hard disk drive (HDD), are utilized in a wide variety of devices in stationary and mobile computing environments. Examples of devices that incorporate magnetic storage systems include desktop computers, portable notebook computers, portable hard disk drives, digital versatile disc (DVD) players, high definition television (HDTV) receivers, vehicle control systems, cellular or mobile telephones, television set top boxes, digital cameras, digital video cameras, video game consoles, and portable media players.

A typical HDD includes magnetic storage media in the form of one or more flat disks. Scanning systems are used to optically scan the disks to detect any defects before the disks are installed in disk drives. The scanning systems often include a test head that directs a laser beam onto the disk to obtain reflected optical signals indicative of defects in the media. The optical signals are converted into electrical signals that are processed by detection circuitry to detect the defects. Various issues can arise in the processing of the electrical signals by the detection circuitry that make it difficult for test personnel to quickly and efficiently perform the tests, particularly if the detection circuitry is intended to detect small defects like carbon voids in the media. Herein, circuitry and related methods are provided to address these and other issues.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a circuit for use with an apparatus for detecting a condition of a surface region of a magnetic recording medium. The circuit includes: a plurality of input terminals configured to receive a plurality of input signals from a plurality of optical sensors of the apparatus; a summing circuit configured to generate a summed output signal from the plurality of input signals, wherein the summed output signal comprises a first component representative of the condition and second component representative of a total power of an optical transmitter of the apparatus; and a level shifting circuit configured to receive an offset signal and the plurality of input signals and further configured to provide dynamic level shifting of the second component of the summed output signal based on the offset signal and the plurality of input signals, wherein the level shifting circuit is configured to set a slope of the second component as a function of the power of the optical transmitter of the apparatus to a selected slope values.

In some aspects, the first component comprises frequencies above a first threshold frequency and the second component comprises frequencies at or below a second threshold frequency, and wherein the first threshold frequency is no less than the second threshold frequency. In some examples, the first threshold is set to, e.g., 1 MHz, so that the first component of the summed output signal comprises relatively high frequency components (e.g., alternating current (AC) components that are representative of the particular condition to be detected) and the second threshold is set to, e.g., 40 Hz, so that the second component of the summed output signal comprises relatively low frequency components (e.g., direct circuit (DC) components that are representative of the power of the optical transmitter). In other aspects, the first and second thresholds may be set to the same value, such as 40 Hz, or another suitable cutoff value that may be used to distinguish between the higher frequency components of the summed output signal that are representative of a particular condition to be detected and the lower frequency components that are representative of the power of the optical transmitter. In some aspects, the condition to be detected is a defect on the magnetic recording medium, such as a carbon void. In some aspects, the slope value is selected so that a range of values of the second component remains within predetermined lower and upper limits throughout a range of power levels of the optical transmitter of the apparatus to permit detection of carbon void defects while the optical power of the detection system is within a nominal power range. In some aspects, the circuit may be a component of a quad channel detector (QCD).

In another aspect of the disclosure, a method is provided for processing input signals from an apparatus for detecting a condition of a surface region of a magnetic recording medium. The method includes: receiving a plurality of input signals from a plurality of optical sensors of the apparatus; generating a summed output signal based on the plurality of input signals using a first circuit that is configured to generate first and second components of the summed output signal, the first component representative of the condition and the second component representative of a power of an optical transmitter of the apparatus; and performing dynamic level shifting of the second component of the summed output signal using a second circuit that is coupled to the first circuit and is configured to perform the level shifting based on an offset signal and the plurality of input signals, wherein the level shifting is performed to set a slope of the second component as a function of the power of the optical transmitter of the apparatus to a selected slope value.

In yet another aspect of the disclosure, an apparatus is provided for detecting a condition of a surface region of a magnetic recording medium. The apparatus includes: means for receiving a plurality of input signals from a plurality of optical sensors of a magnetic recording media scanning device; means for generating a summed output signal based on the plurality of input signals, the summed output signal having first and second components, the first component representative of the condition and the second component representative of a power of an optical transmitter of the apparatus; and means for level shifting the second component of the summed output signal based on an offset signal and the plurality of input signals, wherein the level shifting is performed to set a slope of the second component as a function of the power of the optical transmitter of the apparatus to a selected slope value.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to circuits, systems, methods and apparatus for processing electrical signals representative of possible defects in magnetic recording media, such as carbon voids in hard disk drive (HDD) media. For example, a circuit is disclosed herein that allows dynamic level shifting of a direct current (DC) voltage for a highly sensitive optical detector channel of an HDD media defect scanning system. The circuit allows the optical detector channel of the system to operate with a high gain condition to detect media carbon voids while maintaining the signals well within the electrical operating limits of the scanning system. Such scans may be performed at various stages during a hard disk fabrication process and after completion of the process. Defective disks may be discarded.

Figure 1:
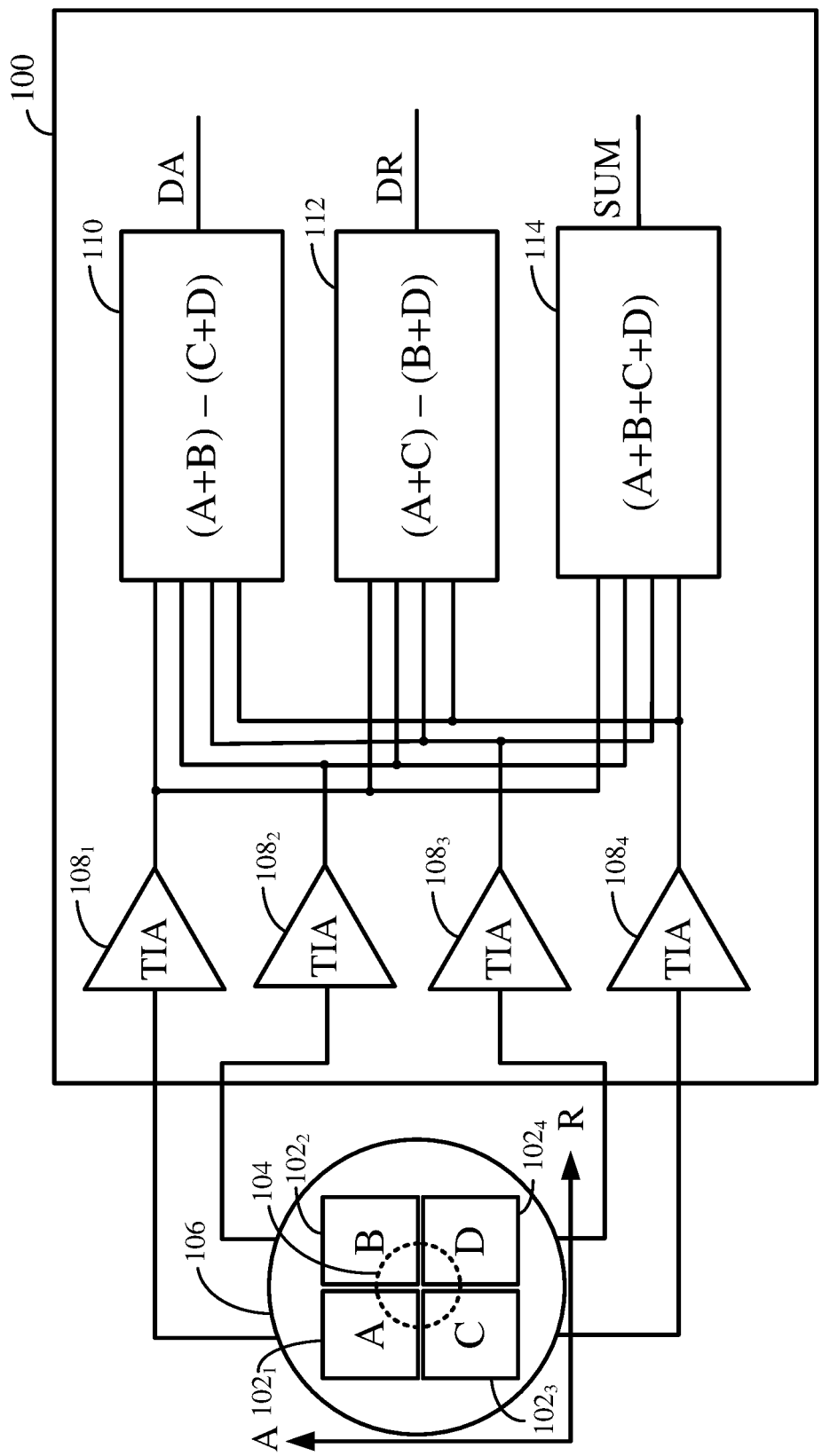
FIG. 1 illustrates an exemplary quad channel detector (QCD) in accordance with an aspect of the disclosure.

In some aspects, the HDD media optical scanning system uses a Quad Channel Detector (QCD), which employs four photodiodes to detect laser beam deflection and total power of a reflected beam from the media surface. FIG. 1 illustrates an exemplary QCD 100, which receives input signals from four diodes 1021, 1022, 1023, and 1024 of a test head scanning system (not shown in FIG. 1) that directs a laser beam onto a spot 104 on a media disk 106. Ideally, the laser beam is centered relative to the four diodes, as shown, which may be set by an operator or user of the system during a setup procedure. Four Transimpedance Amplifiers (TIAs) 1081, 1082, 1083, and 1084 separately receive signals from the four diodes, as shown, and route amplified versions of the signals to three analog components, including an azimuth direction (DA) channel component 110, a radial direction (DR) channel component 112, and a SUM channel component 114. The SUM channel component 114 provides an analog summation of all four photodiode outputs (A+B+C+D), which includes both alternating current (AC) and DC signal components.

Herein, by AC components of the signal, it is meant that the components have frequencies above a first upper cutoff threshold, such as 1 MHz (e.g., frequencies in the range of 1-2 MHz), whereas the DC components of the signal have frequencies at or below a second lower cutoff threshold, such as 40 Hz or, in other examples, 10 Hz. Hence, the DC components do not necessarily have a frequency of zero and do not necessarily correspond to an electrical current that flows only in one direction. Rather, herein DC refers to very low frequencies, whereas AC refers to much higher frequencies, including frequencies in the MHz range and beyond. As will be explained below, the lower cutoff frequency may be set using a capacitor that operates as a low pass filter within the summing circuit 114.

The DC output level of the QCD SUM channel serves at least two purposes: 1) providing a signal to permit aligning the QCD during installation and setup of the scanning system and 2) providing a measure of the total power of the laser beam reflected from the media surface (i.e., providing a feedback on system performance). Note that the SUM signal may also be used to detect large defects. Herein, the detection of smaller defects such as carbon voids is of greater interest as they are more difficult to detect. Small defects may cause a slight bump or deviation in the AC component of the SUM signal. Conventional "low gain" systems may not be capable of detecting such small deviations.

A high gain QCD (which may also be referred to as a Super QCD) is configured to set the QCD SUM channel to a very high gain (e.g., 10× or more) relative to lower gain QCD systems in order to allow detection of critical media defects called carbon voids. The SUM channel of the high gain QCD is highly sensitive to any reflected light power changes from media surface (e.g., power changes <1%). A change in the reflected power from the media is indicative of carbon void defects on the media surface. The high gain condition of the SUM channel thus improves the sensitivity of the optical scanning system to detect carbon void defects and similar defects in the media. Note that the AC frequencies are typically around 1 MHz but the system bandwidth may be, e.g., 15 MHz. The high gain boosts the SUM channel's AC signal in response to detected carbon voids but can also adversely affect the SUM channel's DC signal (i.e., the average optical power), increasing the DC signal in the same proportion (e.g., 10×), causing certain problems, which can be best understood with some background on the low gain QCD and the high gain QCD SUM channel electrical circuit design configurations.

Referring again to FIG. 1, the TIAs 1081, 1082, 1083, and 1084 are the first stage where the four outputs from the QCD diodes of the test head are connected. The TIAs are current-to-voltage converters and are each set to an inverting configuration. So, with more light on the photodetectors, the diodes drive more current through the corresponding TIAs, and so the output voltage of the TIAs become more negative. The SUM channel 114 is the addition of all four of the diode outputs and may be realized in the circuit using inverting summing amplifier circuitry (hence yielding a double inversion):

SUM=$-(V_1+V_2+V_3+V_4)$, where $V_{1-4}$ are the individual diode output voltages;

$V_{1-4}=-I_d*G$, where $I_d$ is the diode current and $G$ is the TIA gain.

Hence, as light incident on the diodes increases, the diodes drive more current, which drives the voltages $V_{1-4}$ more negative while the SUM output voltage increases (due to the second inversion). Thus, the SUM output voltage increases with an increase in light on the diodes, i.e., the SUM output voltage changes in direct proportion to laser power.

Figure 2:
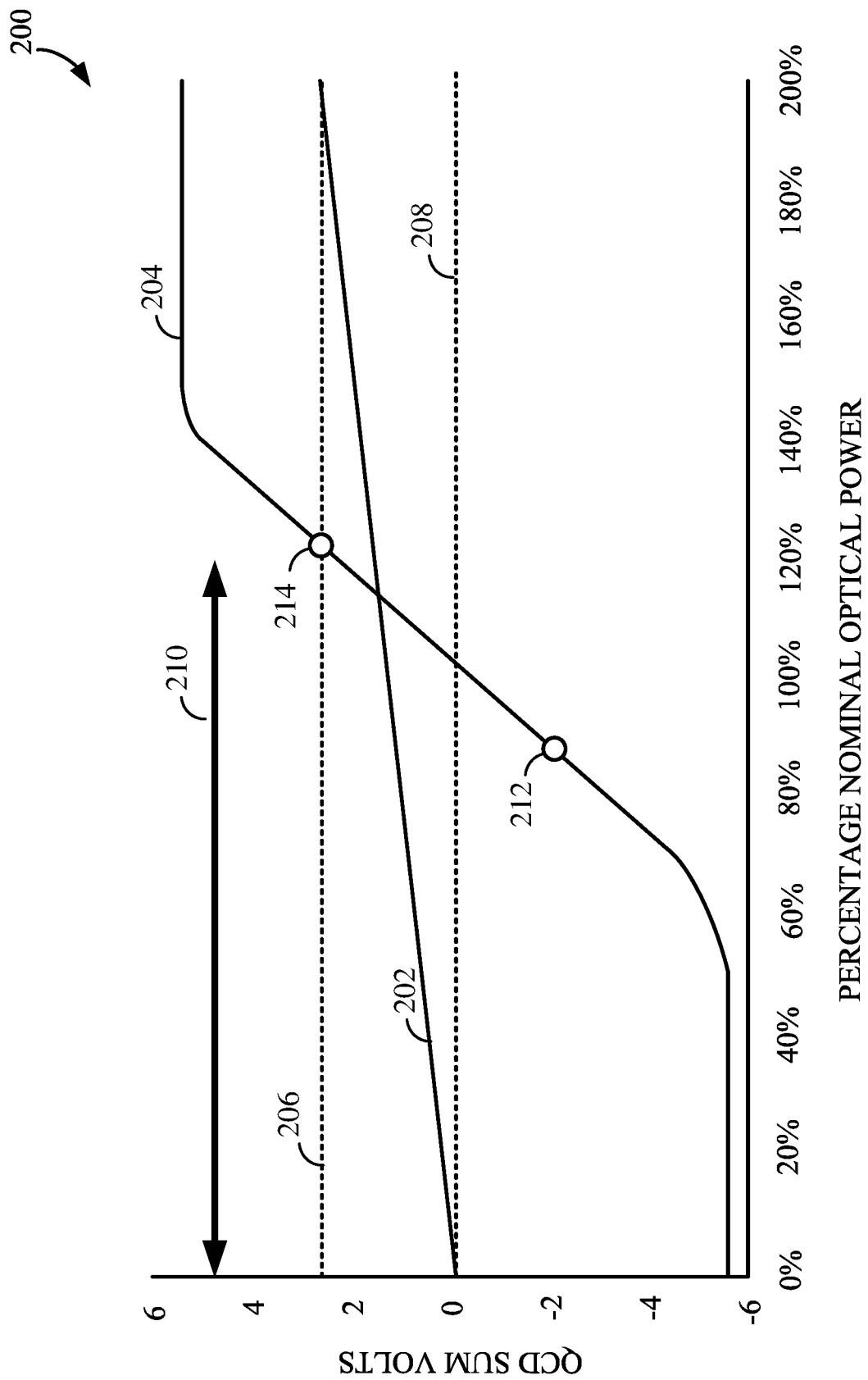
FIG. 2 is a graph illustrating exemplary QCD signals for both low gain and high gain QCD systems without dynamic DC level shifting.

FIG. 2 is a graph 200 illustrating exemplary QCD SUM voltages (Y axis) as a function of a percentage of nominal optical power (X axis) for the low gain QCD (curve 202, e.g., 13 mV/%) and the high gain QCD system (curve 204 e.g., 136 mV/%). As shown in FIG. 2, the SUM output for both curve 202 and 204 increases with increase in light on diode (at least within certain ranges). Curve 204 has a much higher slope than curve 204 as a result of the higher gain in the high gain QCD system. The dotted black lines 206 and 208 denote the full range of DC measurement possible for the system, which, in this example, is 0-2.5V. Arrow 210 indicates the total range of the laser power measurements required for tracking the scanning system performance. The two dots (212 and 214) on curve 204 are measurements taken for two high gain QCD systems, which should be at 100% nominal optical power, but due to system variations, the points exhibit a higher spread in the QCD SUM measurements.

Two main problems can be observed in the high gain QCD curve 204. First, the two dots (212 and 214) on the curve 204 are close to (see 214) or fall beyond (see 212) the black dotted lines 206 and 208 and are thus out of limits for measurement. This is a problem during installation (discussed further below). Second, curve 204 ranges only 20% on the X axis for the 0-2.5 Y axis DC measurement range. Curve 202 on the other hand can range the complete 0-100% on the X axis. This means that the best case for laser decay or a low laser power condition is that the high gain QCD can provide tracking only up to 20% decay, in this example.

The high gain condition on the SUM channel's DC response for the high gain QCD system thus poses several problems:

(a) High variations from system-to-system: The SUM channel DC level can have high variations from system-to-system in response to minor changes relating to system variations or tolerances because of the high gain or slope of the SUM channel.

(b) Installation difficulties: operators or users of the scanners rely on the SUM channel DC voltage to exceed a positive threshold voltage as a "go condition" during installation, but in a high gain QCD, it is possible for the SUM DC to have negative voltage values (or values less than a "no go condition" threshold), even though the QCD setup is fine, i.e., there can be false negatives. This problem can also be affected by the high variations discussed above in (a).

(c) Limited laser power measurement: The SUM DC voltage is directly proportional to the laser power reflected from the media surface. In the scanning system, this SUM DC measurement is used as a metric of the actual laser power or system optimum performance. The SUM DC voltage is tracked over time to predict performance of the laser or the scanning system. However, with the higher gain high gain QCD, the full scale measurement could be limited to as low as 20% range depending on system configuration, i.e., measurement is possible for only the range of 100% to 80% of laser power. This is mainly because in the high gain high gain QCD setup, the SUM DC input already reaches certain analog to digital converter (ADC) reference voltage limits within the system.

Insofar as issue (b) is concerned, note that operators or users of the media scanners rely on an LED Indicator or Tracking board for alignment, which provides feedback to the user in two-dimensions on how to perform and adjust laser beam positioning during installation. The high gain condition can make it difficult for the operators to use the LED Indicator board, as there is often only a very narrow window within which the LED board provides good feedback to finalize the alignment. So, the operators often complain the system is too sensitive and takes too long to adjust the beams to desired locations and, furthermore, that incorrect feedback is provided by the LED status of the scanner even though alignment looks fine.

A significant point to note in the QCD channel setup is that there is only one SUM channel output and the optical scanning system electronics uses both the SUM channel's AC and DC components for different purposes. Thus, boosting the SUM channel gain impacts both the AC and DC components, which has the undesired issues discussed above.

One possible approach to addressing these issues is to equalize the SUM DC across systems to the same value by changing the laser power. This approach addresses some of the issues noted above but introduces an additional step during test setup and introduces another variable during setup, which could be an issue during debugging of any system related issues. Moreover, this approach would not solve the beam alignment issues described in b) above.

Another approach is to separate the SUM DC and AC signals into two different channels with separate AC and DC component. This requires additional hardware modifications and new parts to support the changes, and thus might be costly. Also, printed circuit board (PCB) space within the scanner is small and so it is advantageous to minimize the number of components.

Herein, a modified high gain QCD is provided that includes dynamic DC level shifting circuitry to address the aforementioned problems. The modified QCD is referred to herein as a DC level shifting QCD. The DC level shifting QCD is designed to de-couple the AC and the DC components for the same SUM channel output. This approach of providing a dynamic DC level shifting circuit desensitizes (or lowers the gain of) the SUM DC while maintaining the high AC gain, which is useful for detecting carbon voids as in the high gain QCD configuration. Note here that the high frequency optical power changes relate to the signal SUM AC changes and the average optical power corresponds to the SUM DC voltage.

An exemplary DC level shifting QCD includes an electrical design implementation of a level shifter circuit on the final stage summing driver amplifier. In some aspects, the design uses the DC outputs of all four of the individual diodes and a fixed DC offset signal as inputs to the level shifter portion of the circuit while also providing gain or slope as a final SUM DC output. In some aspects, the level shifter portion of the circuit is configured so that the gain of the level shifter only affects the SUM DC component while maintaining a high gain on the AC part of the electrical signal.

Figure 3:
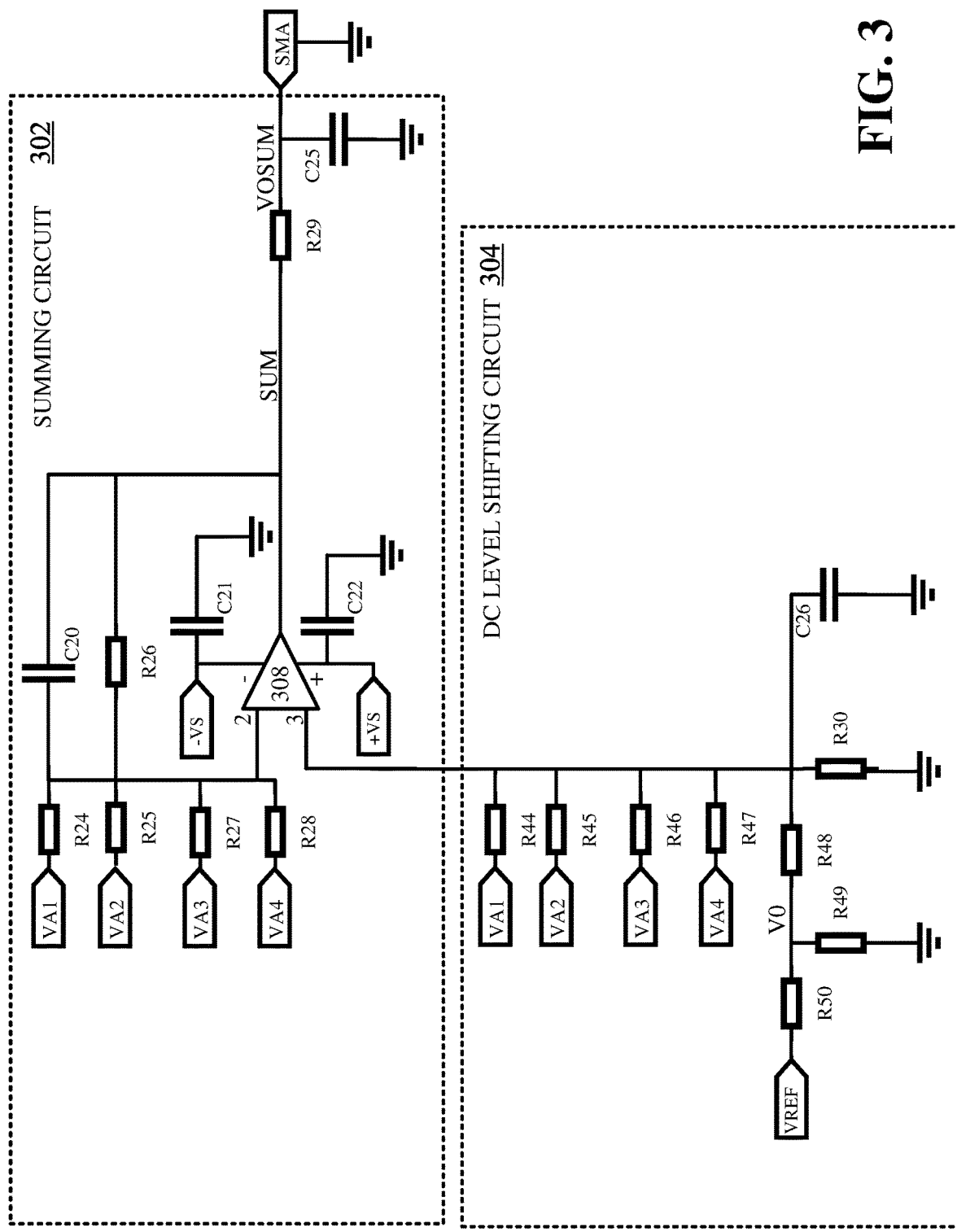
FIG. 3 illustrates an exemplary summing amplifier of a DC level shifting QCD in accordance with an aspect of the disclosure.

FIG. 3 illustrates an exemplary summing amplifier 300 of the overall the DC level shifting QCD. That is, FIG. 3 illustrates a modified version of the SUM component 114 of FIG. 1 that has been modified to provide for dynamic high gain DC level shifting. As shown, the modified SUM component 300 includes a summing circuit 302 and a DC level shifting circuit 304. The summing circuit 302 is configured to receive a set of four input signals (VA1, VA2, VA3, VA4) from four corresponding optical sensors (photodiodes) of a media scanning apparatus (see, FIG. 1) and generate a summed output signal SUM (or VOSUM) at an output terminal SMA that has an AC component (representative of a media defect or other condition on the surface of an HDD disk being scanned) and a DC component representative of a total power of an optical transmitter of the scanning apparatus. The DC level shifting circuit 304 is configured to receive a fixed DC offset signal derived from a stable voltage reference source like Zener diode (VREF, e.g., 2.5 V) and the same set of four input signals (VA1, VA2, VA3, VA4) via a separate set of input terminals and is further configured to provide or perform dynamic level shifting of the DC component of the summed output signal (SUM) based on the DC offset signal and the set of four input signals.

The exemplary summing circuit 302 includes a first set of input terminals (also denoted VA1, VA2, VA3, VA4) to receive the set of four input signals and circuitry coupled to the first set of input terminals and configured to generate the summed output signal SUM. The circuitry includes a differential amplifier 308 (OPAMP) with a first (inverting) input terminal (pin 2) coupled to each of the four input terminals of the first set of input terminals via a set of corresponding input resistors (R24, R25, R27, R28) and with a second (non-inverting) input terminal (pin 3) coupled to an output of the DC level shifting circuit 304. The resistors (R24, R25, R27, R28) may be of equal value (e.g., 2K ohms). The differential amplifier 308 also receives a negative VS (−VS) supply voltage (which is also coupled through a 0.1 µF capacitor C21 to ground) and receives a positive (+VS) supply voltage (which is also coupled through a 0.1 µF capacitor C22 to ground). Additionally, the summing circuit 302 includes a 2.2 pF capacitor C20 and a 2K ohm resistor R26 connected in parallel as shown between the input resistors (R24, R25, R27, R28) and the output of the differential amplifier 308. Still further, a resistor R29 and a capacitor C25 are coupled along the output signal line.

Turning now to the DC level shifting circuit 304, a separate set of input terminals are provided to receive the VA1, VA2, VA3, VA4 signals from the photodiodes. The input terminals of the DC level shifting circuit 304 are coupled via 5 K ohm resistors R44, R45, R46, and R47 to the second (non-inverting) input terminal of the differential amplifier 308. The resistors R44, R45, R46, and R47 and the connection line that couples the resistors to the second input terminal of the differential amplifier 308 may be regarded as a first sub-circuit of the DC level shifting circuit 304. The resistances of R44, R45, R46, and R47 are also denoted herein as having resistance Ru. Additionally, the input terminals of the DC level shifting circuit 304 are coupled through the resistors R44, R45, R46, and R47 to a high value (fat) capacitor C26 (e.g., 3.3 µF) and to a 15K ohm R30 resistor, which are connected in parallel to ground. The resistance of the R30 ground resistor is also denoted herein as Rd. Still further, the DC level shifting circuit 304 includes a 950 K ohm resistor R50 and a 5 K ohm resistor R48 connected in series to a VREF input to provide a fixed DC offset signal of V0 (e.g., 1 V). As shown, another resistor R49 (e.g., 950 ohm) couples V0 to ground. Collectively, the components R50, R49, R48, R30 and C26 may be regarded as a second sub-circuit. Collectively, Ru resistors R44, R45, R46, R47 and Rd resistor R30 form a potential divider network with resistance Rp.

The capacitor C26 provides a low pass filter (LPF) with, for example, a cut-off of 40 Hz, though even lower cut-off frequencies may be used, such as 10 Hz. The use of the high value capacitor C26 builds a low pass filter at the input of the amplifier 308 and serves to distinguish the higher AC (or first) components of the summed output signal from the lower DC (or second) components of the of the summed output signal. The low pass filtering substantially ensures that only the final SUM DC output is level shifted with the desired gain and does not significantly impact or change the SUM AC output. In this manner, the slope of the SUM channel is reduced to a small value (only on the SUM DC component) while ensuring the slope (or gain) has only positive values. Stated more generally, the resistances of the input resistors R44, R45, R46, and R47 ($R_u$) and the ground resistor R30 (Rd) and the capacitance (C) of the capacitor (C26) are selected or configured (as described more fully below) to set a slope or gain of the DC component of the summed output signal SUM of the summing circuit as a function of the power of the optical transmitter of the apparatus to a selected slope value.

An exemplary final SUM amplifier output DC voltage formula is as follows:

$$SUM_{DC} = -0.0625*(V_1+V_2+V_3+V_4)+0.9375$$

The exemplary slope of 6.25% (which is a relatively low value) compensates for the high gain change on the SUM DC and minimizes the full-scale range of the SUM DC. The constant of 0.9375V ensures the SUM output voltage stays positive when laser power is 0 mW. The diode voltage inputs to the level shifter act as variables to the equation (hence providing a dynamic technique), instead of having only a fixed DC offset approach. The SUM equation for the designed slope and offset substantially ensures that the full range of the SUM DC is within the limits of measurement for an entire input range.

In some aspects, the transfer function for the summing component of the DC level shifting QCD may be derived as follows. The level shifting circuit addition to the SUM channel driver circuit shifts the SUM DC based on a linear equation. The transfer function may be derived by considering both DC and AC components of the SUM channel. The level shifting DC offset, which is applied to the SUM, is a linear equation: y=m*x+c, where m=>the slope as determined by selection of the $R_u$ and $R_d$ resistor values, x=>the TIA output, which is variable and dependent on laser power incident on the diode, and c=>a constant as determined by the fixed DC offset input $V_0$ and selection of $R_u$ and $R_d$ resistor values.

For simplicity, all the $R_u$ resistors may be chosen to be the same value. It is initially assumed that the beam incident on the QCD is centered and the TIA outputs for all four diodes is the same $-V_x$. By the Superposition theorem, the cumulative DC offset at the non-inverting input of the amplifier can be calculated by individually considering each voltage input while others are shorted to ground.

For the potential divider network, the parallel combination of all five resistors (R44, R45, R46, R47, and R30) is $R_p$:

$$R_p = 5K \| 5K \| 5K \| 5K \| 15K$$

$$R_p = R_u \| R_u \| R_u \| R_u \| R_d$$

$$R_p = (R_u/4) \| R_d$$

Voff=$V_x * R_p/(R_p+R_u)$, where Voff is the offset contribution of one TIA output at the non-inverting terminal of the driver amplifier. As all four TIA outputs are assumed to be same, the total offset is:

$$4 * V_x * R_p/(R_p+R_u)$$

Similarly, the offset contribution for the fixed voltage input $V_0$ is:

$$V_0 * R_p/(R_p+R_u)$$

Adding all together, the total DC offset at the non-inverting input is:

$$R_p/(R_p+R_u) * (4*V_x+V_0)$$

Output DC level shift=Input*Noise Gain=$[R_p/(R_p+R_u)*(4*V_x+V_0)]*[1+R_f/R_i]$ For the SUM driver, the feedback resistor $R_f$=2K ohm and the four input resistors ($R_{in}$) in parallel gives equivalent $R_i$ as $R_{in}/4$=2K/4=500 ohm.

Noise gain of the driver amplifier=1+2K/500=5

Output DC level shift is therefore:

$$= [R_p/(R_p+R_u)*(4*V_x+V_0)]*5$$

$$= 5*R_p/(R_p+R_u)*4*V_x + 5*R_p/(R_p+R_u)*V_0$$

$$==> m'*V_x+c$$

where $m'=5*R_p/(R_p+R_u)*4$ and $c=5*R_p/(R_p+R_u)*V_0$.

More generally, when considering each TIA output to be different, i.e., the beam on QCD is not centered, the analysis yields:

Output DC level shift $==> m*(V_1+V_2+V_3+V_4)+c$, where $m=5*R_p/(R_p+R_u)$ and $c=5*R_p/(R_p+R_u)*V_0$.

Therefore, the SUM output is:

SUM=$-(V_1+V_2+V_3+V_4)+5*R_p/(R_p+R_u\sim)(V_1+V_2+V_3+V_4+V_0)$ where the term $5*R_p/(R_p+R_u)$ $(V_1+V_2+V_3+V_4+V_0)$ represents the DC offset level shift.

For a resistor selection of $R_u$=5K and $R_d$=15K, $R_p$=1.15K=>$5*R_p/(R_p+R_u)$=0.9375:

$$SUM_{DC} = -0.0625*(V_1+V_2+V_3+V_4)+0.9375*V_0$$

$$SUM_{DC} = -0.0625*(V_1+V_2+V_3+V_4)+0.9375$$

with ($V_0$=1V→derived from $V_z$=2.495V.

Installing a suitable capacitor at the non-inverting terminal ensures that only the input DC component is used to determine the DC offset and the high frequency components are filtered out. By using a fat capacitor (at least 1 uF), the low pass filter is set to filter out the AC components of the input. This means that the level shifting only changes the DC component of the SUM output and the AC component (e.g., defect response) remains the same:

$$SUM_{AC} = -(V_1+V_2+V_3+V_4)$$

When the SUM output is broken down as two components DC and AC, the individual transfer functions are:

$$SUM_{DC} = -0.0625*(V_1+V_2+V_3+V_4)+0.9375$$

$$SUM_{AC} = -(V_1+V_2+V_3+V_4)$$

Hence, the DC component of the output signal is level shifted and has a small slope to remain within proper bounds, while the AC component is not shifted and simply represents the sum of the four input signals (inverted).

Figure 4:
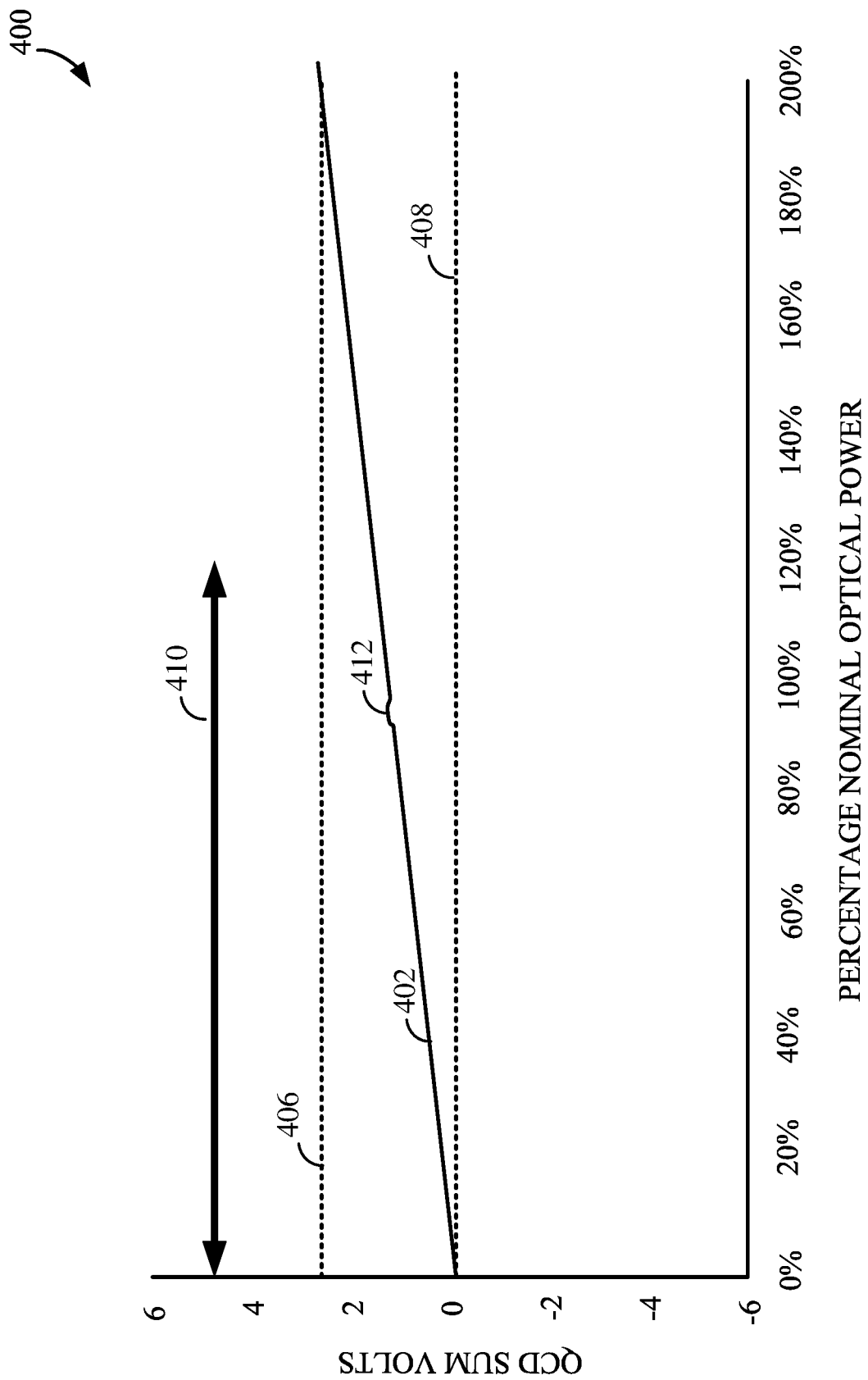
FIG. 4 is a graph illustrating exemplary QCD signals for a dynamic DC level shifting QCD that uses a fixed DC offset QCD in accordance with an aspect of the disclosure.

FIG. 4 is a graph 400 illustrating exemplary QCD SUM voltages (Y axis) as a function of a percentage of nominal optical power (X axis) for a high gain QCD (curve 402) with dynamic DC level shifting using a fixed DC offset. As shown in FIG. 4, when the dynamic DC level shifting is applied using the fixed DC offset, the resulting slope is the same as the low gain slope 202 of FIG. 2 (e.g., 13 mV/%) to permit proper setup and installation since the values are all within the acceptable range marked by lines 406 and 408. However, by virtue of the dynamic DC level shifting, the AC component of the SUM signal will still have the enhanced sensitivity provided by the high gain features of the QCD to permit detection of carbon voids and the like. In the example of FIG. 4, a carbon defect in the media being scanned causes a slight deflection or bump 412 in the slope of line 402, permitting detection of the defect. Such a defect would not likely be detected in a low gain system since there is insufficient sensitivity.

Note that, without the fixed DC offset, the slope of the high gain signal 402 would be correct (as with slope 202 of FIG. 2); however, the line 402 would be shifted downward in the figure, and hence the leftmost portions of the line would be below the lower bound 408. The fixed DC offset addresses that issue. For any particular embodiment of the dynamic DC level shifting QCD, the value of the fixed DC offset can be adjusted as needed to place the slope 402 between the upper and lower bounds 406 and 408 for a desired range of nominal optical power values on the X-axis, e.g., from 0% to 120%, as shown in FIG. 4.

Figure 5:
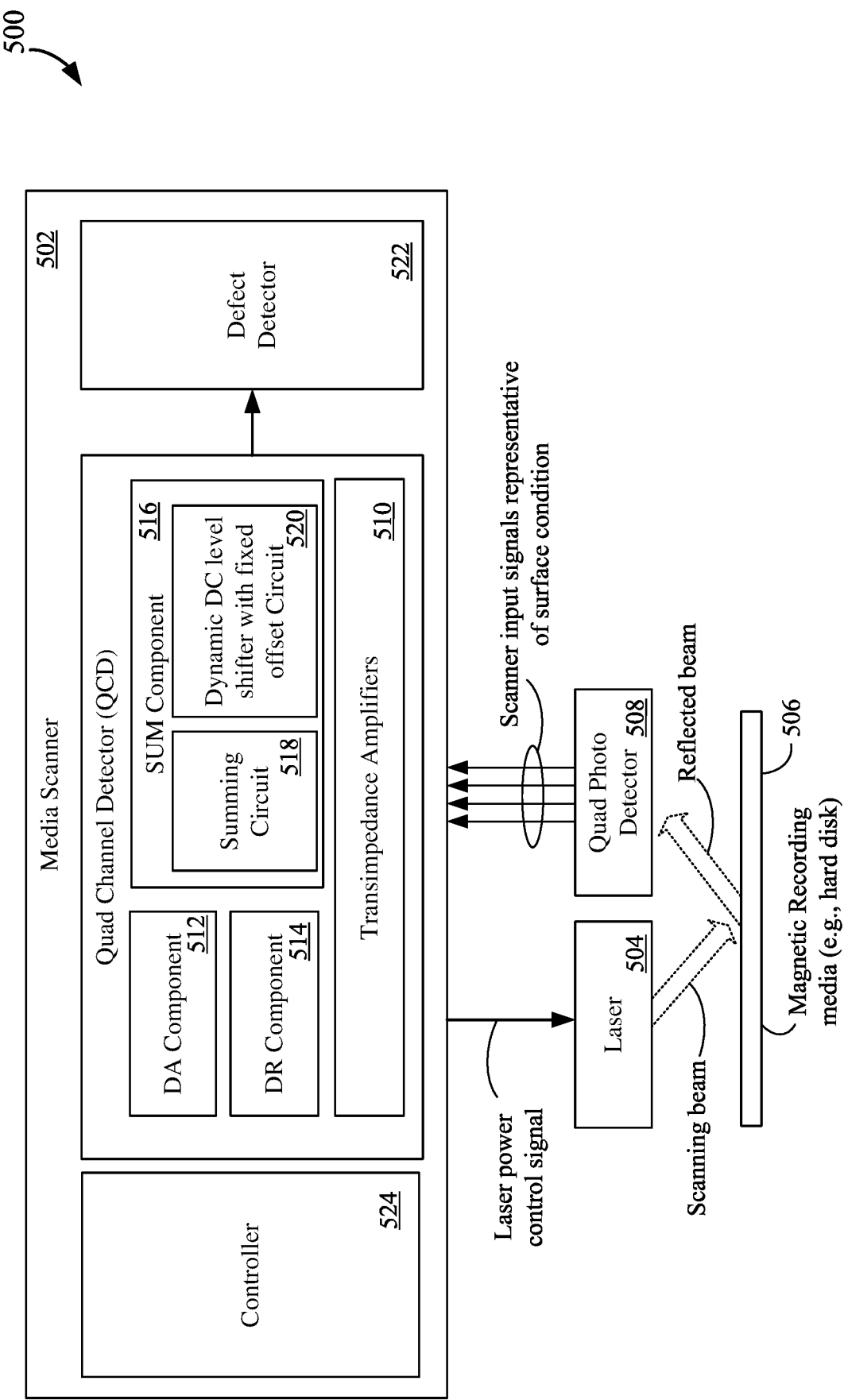
FIG. 5 illustrates selected components of an exemplary magnetic recording medium scanning system in accordance with an aspect of the disclosure.

FIG. 5 illustrates selected components of a magnetic recording medium scanning system 500 configured with a dynamic DC level shifter with a fixed offset. The scanning system includes media scanner 502 that sends a laser power control signal to a laser 504 to control the total power of a laser scanning beam that is directly onto a magnetic recording media such as a hard disk 506. A reflected or scattered beam is detected by a quad photo detector 508, which includes four photodiodes, as shown in FIG. 1. The quad photo detector 508 sends four separate scanner signals to the media scanner 502, one for each of the four photodiodes. Collectively, the scanner signals are representative of conditions on the region of the surface of the magnetic recording medium that the laser 504 irradiates, and the signals may include an indication of a defect such as a carbon void. A set of transimpedance amplifiers 510 amplify the signals and send each of the four signals separately to a DA component 512, a DR component 514, and a SUM component 516. (See, again, FIG. 1.) The SUM component 516, which may be configured as the circuit of FIG. 3, includes a summing circuit 518 and a DC level shifter with fixed offset circuit 520. The DA component 512, the DR component 514, and the SUM component 516 send the aforementioned DA, DR, and level shifted SUM signals to a defect detector 522 that analyzes the signals to detect defects, if any, within the magnetic recording media. A controller 524 controls the operations of the media scanner 502. Various other components may be provided as well, which are not shown.

Thus, among other advantages, the dynamic level shifting design of the DC level shifting QCD described herein addresses the problems highlighted above in high gain QCD setups that do not include DC level shifting. For example, the dynamic level shifting design: (1) allows diode to diode variations in DC level to be similar to existing QCD SUM channel setup; (2) allows for ease of installation of the QCD module with system and bring-up; (3) desensitizes the high gain condition on the DC response and allows full range laser power measurement, which is an important system performance metric tracked over time; (4) allows the DC measurement to be within the limits of the ADC scale for accurate measurements; and (5) provides a low cost approach for high gain QCD systems.

Alternative and Additional Examples

Figure 6:
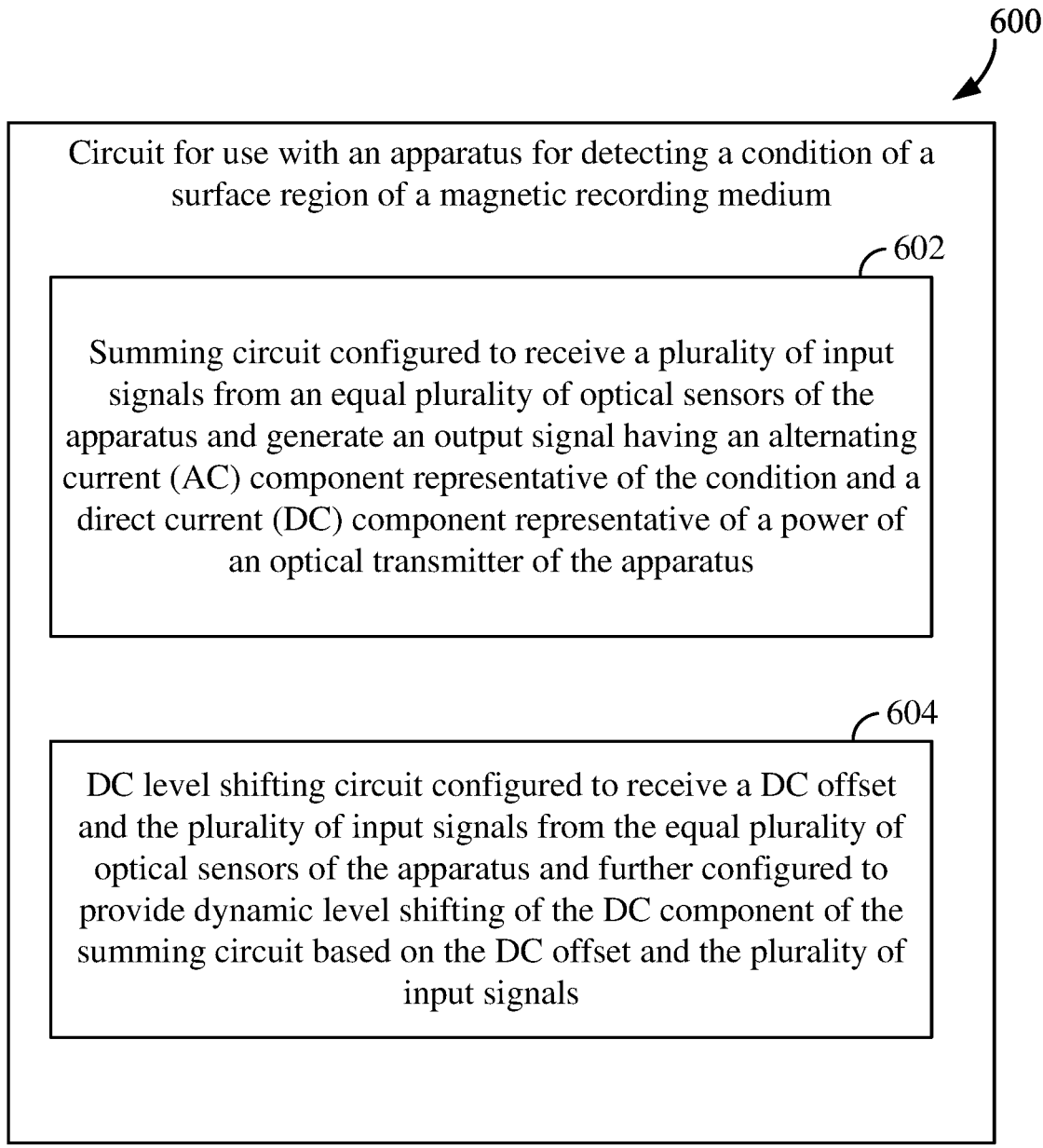
FIG. 6 is a block diagram of an exemplary circuit for use with a media scanner or other apparatus in accordance with an aspect of the disclosure.

FIG. 6 is a block diagram of a circuit 600 for use with an apparatus (such as a media scanner) for detecting a condition of a surface region of a magnetic recording medium. Circuit 600 includes a detection circuit 602 configured to receive a plurality (or set) of input signals from an equal plurality (or corresponding set) of optical sensors of the apparatus and generate an output signal having an AC component representative of the condition and a DC component representative of a power (e.g., total power) of an optical transmitter of the apparatus. Circuit 600 also includes a DC level shifting circuit 604 configured to receive a DC offset and the plurality (or set) of input signals from the equal plurality (or corresponding set) of optical sensors of the apparatus and further configured to provide or perform dynamic level shifting of the DC component of the summed output signal based on the DC offset and the plurality of input signals. As explained above, the condition on the surface region of the magnetic recording medium may be a carbon void.

Figure 7:
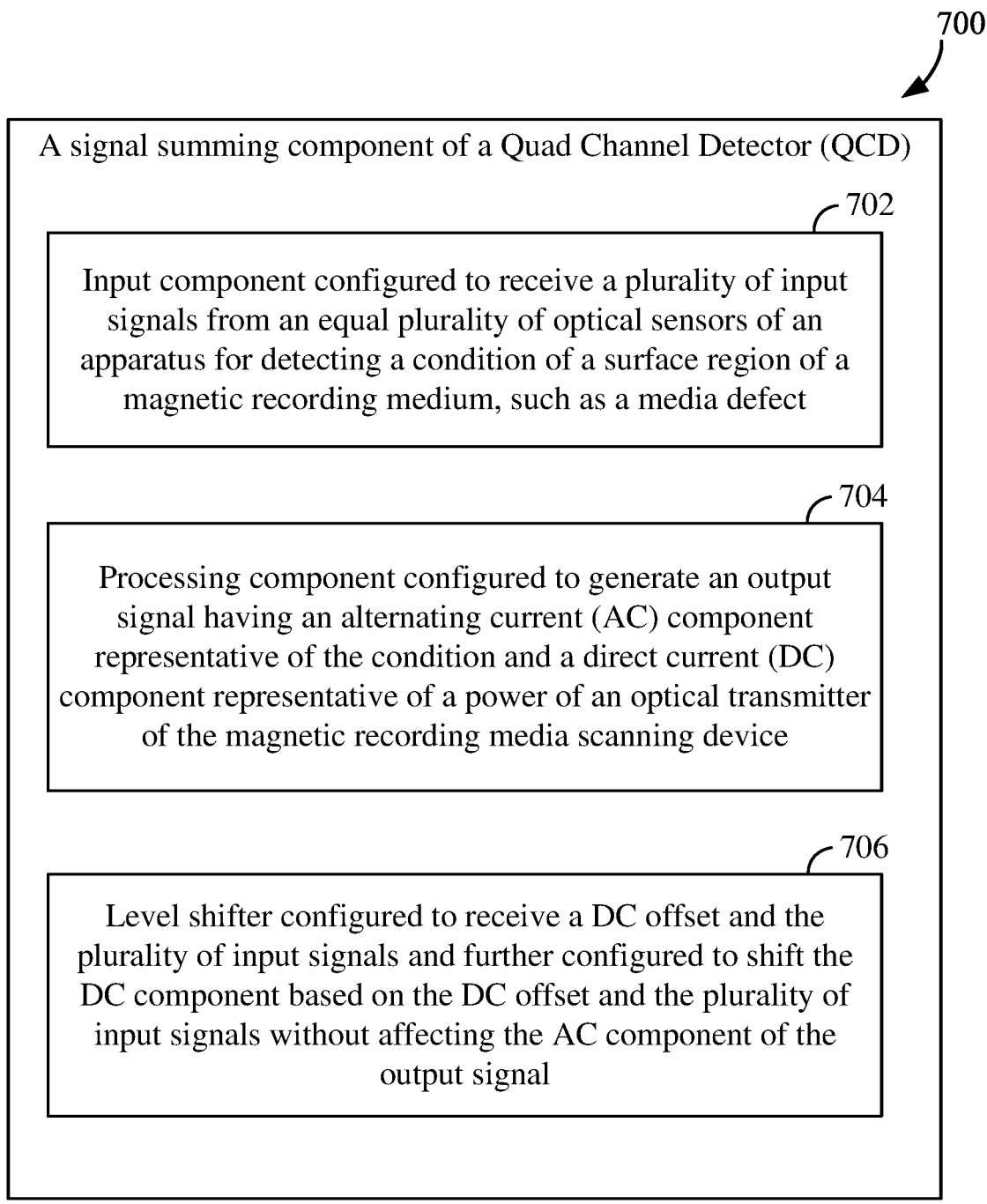
FIG. 7 is a block diagram of an exemplary signal summing component for use with a QCD in accordance with an aspect of the disclosure.

FIG. 7 is a block diagram of a signal summing component (or device, module, or circuit) 700 of a QCD. The signal summing component 700 includes an input component (or device, module, or circuit) 702 configured to receive a plurality (or set) of input signals from an equal plurality (or corresponding set) of optical sensors of an apparatus for detecting a condition of a surface region of a magnetic recording medium, such as a media defect. The signal summing component 700 also includes a processing component (or device, module, or circuit) 704 configured to generate an output signal having an AC component representative of the condition and a DC component representative of a power (e.g., total power) of an optical transmitter of the magnetic recording media scanning device. The signal summing component 700 also includes a level shifter (e.g., a component, device, module, or circuit) configured to receive a DC offset and the plurality (or set) of input signals and further configured to shift the DC component based on the DC offset and the plurality (or set) of input signals without significantly or substantially affecting the AC component. For example, as explained above, a low pass capacitor with a cut off frequency of 40 Hz may be used to avoid affecting the higher frequency components (e.g., the AC components) of the output signal.

Figure 8:
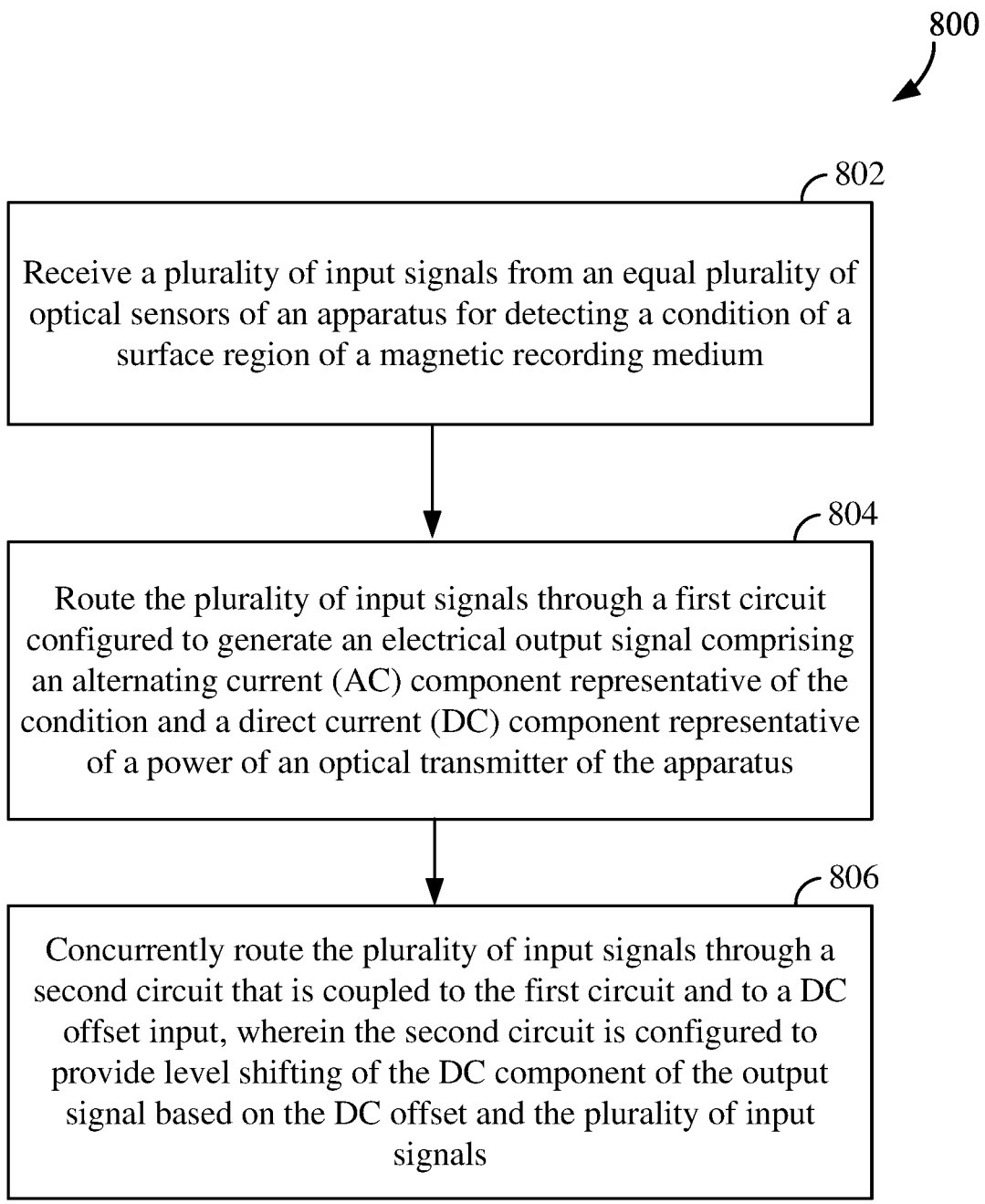
FIG. 8 illustrates an exemplary procedure for processing input signals from an apparatus for detecting a condition of a surface region of a magnetic recording medium in accordance with an aspect of the disclosure.

FIG. 8 is a flow chart illustrating a procedure 800 for processing input signals from an apparatus for detecting a condition of a surface region of a magnetic recording medium, such as a media defect scanning apparatus that is configured to detect media defects such as carbon voids. In some examples, the procedure 800 may be performed using the circuit of FIG. 3 or the devices described in connection with FIGS. 7 and 8. At block 802, the method receives a plurality (or set) of input signals from an equal plurality (or corresponding set) of optical sensors of the apparatus for detecting the condition of the surface region of the magnetic recording medium. At block 804, the method routes the plurality (or set) of input signals through a first circuit configured to generate an electrical output signal comprising an AC component representative of the condition and a DC component representative of a power of an optical transmitter of the apparatus. At block 806, the method concurrently routes the plurality (or set) of input signals through a second circuit that is coupled to the first circuit and to a DC offset input, wherein the second circuit is configured to provide level shifting of the DC component of the output signal based on the DC offset and the plurality of input signals.

Figure 9:
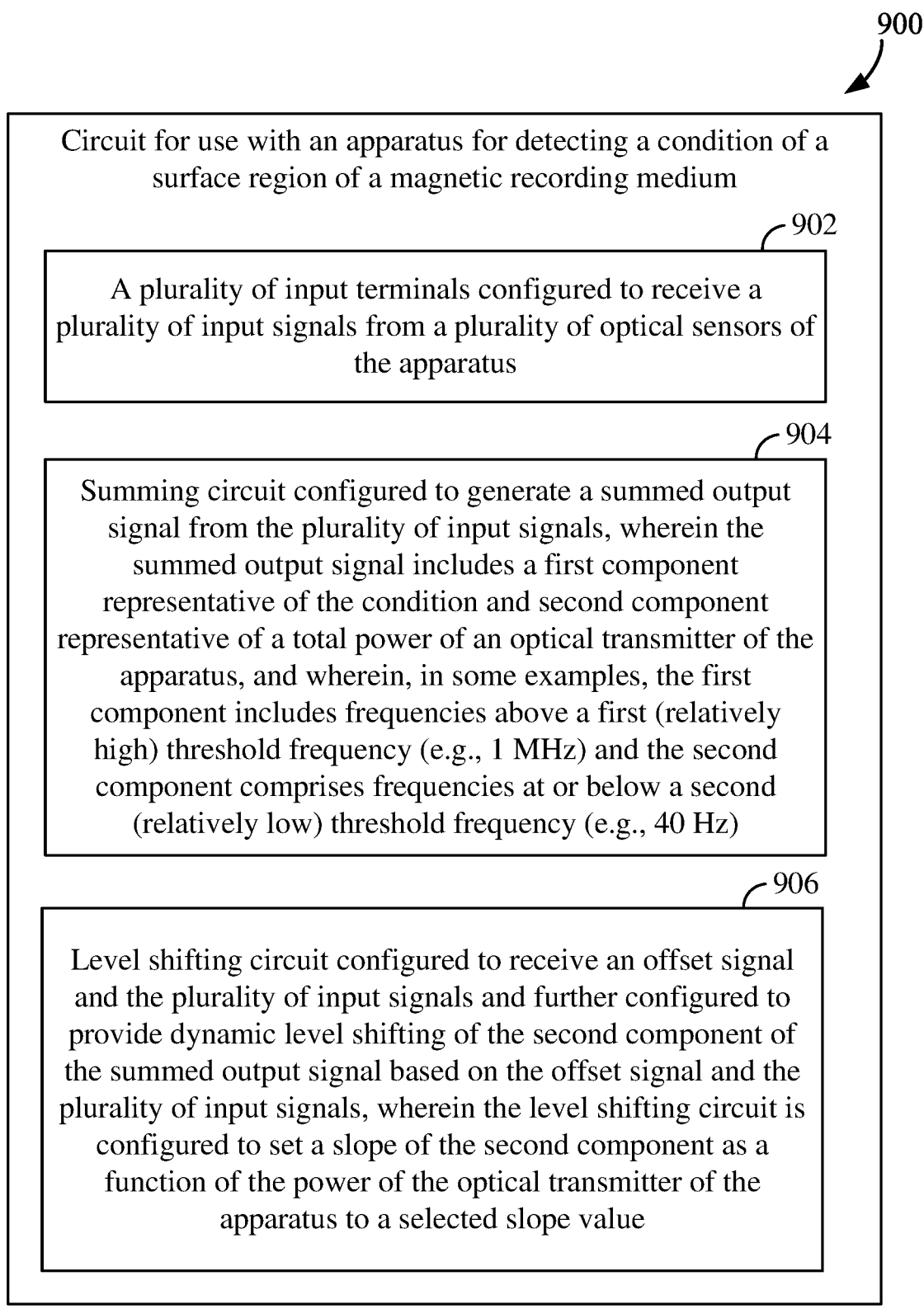
FIG. 9 is a block diagram of another exemplary circuit for use with a media scanner or other apparatus in accordance with an aspect of the disclosure.

FIG. 9 is a block diagram of a circuit 900 for use with an apparatus (such as a media scanner) for detecting a condition of a surface region of a magnetic recording medium. Circuit 900 includes a set or plurality of input terminals 902 configured to receive a set or plurality of input signals from a corresponding set (or equal plurality) of optical sensors of the apparatus. Circuit 900 also includes a summing circuit 904 configured to generate a summed output signal from the set or plurality of input signals, wherein the summed output signal includes a first component representative of the condition and second component representative of a total power of an optical transmitter of the apparatus. In some examples, the first component includes frequencies above a first (relatively high) threshold frequency (e.g., 1 MHz) and the second component comprises frequencies at or below a second (relatively low) threshold frequency (e.g., 40 Hz). As explained above, the first component may be regarded as comprising AC frequencies, whereas the second component may be regarded as comprising DC frequencies. As noted above, in some aspects, the first and second thresholds may be set to the same value, e.g., both set to 40 Hz (or other suitable cutoff value that may be used to distinguish between the higher frequency components of the summed output signal that are representative of the particular condition to be detected and the lower frequency components that are representative of the power of the optical transmitter). Circuit 900 also includes a level shifting circuit 906 configured to receive an offset signal and the set or plurality of input signals and further configured to provide dynamic level shifting of the second component of the summed output signal based on the offset signal and the set or plurality of input signals, wherein the level shifting circuit is configured to set a slope of the second component as a function of the power of the optical transmitter of the apparatus to a selected slope value. See, for example, the slope 402 of FIG. 4, which is set to maintain the QCD sum voltage between upper and lower limits 406 and 408. In some aspects, the first component of the summed output signal may be regarded as an AC component, whereas the second component is regarded as a DC component. In some aspects, the level shifting circuit may be regarded as a DC level shifting circuit. As explained above, the condition on the surface region of the magnetic recording medium may be a carbon void.

Figure 10:
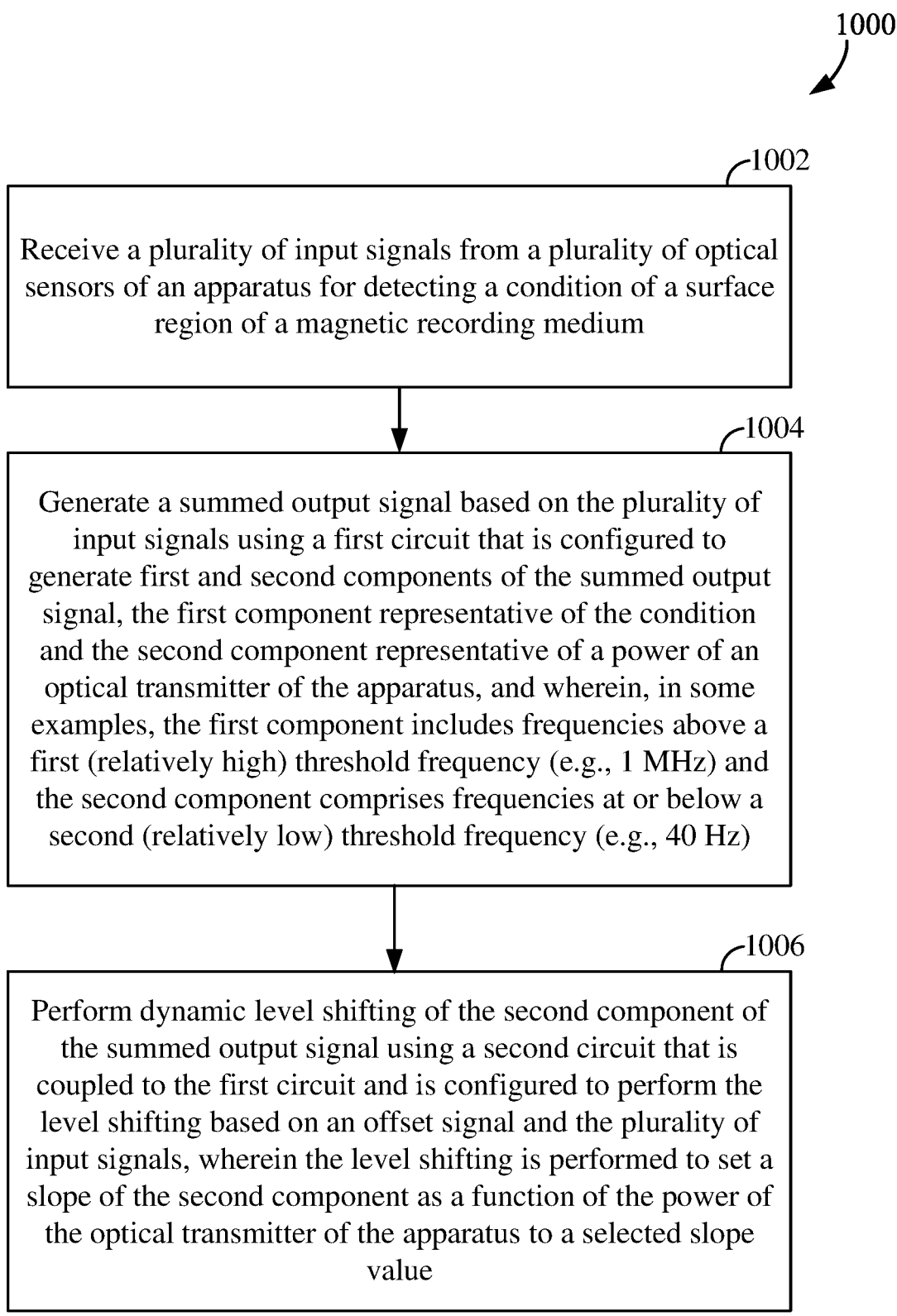
FIG. 10 illustrates an exemplary procedure for processing input signals from an apparatus for detecting a condition of a surface region of a magnetic recording medium in accordance with another aspect of the disclosure.

FIG. 10 is a flow chart illustrating a procedure 1000 for processing input signals from an apparatus for detecting a condition of a surface region of a magnetic recording medium, such as a media defect scanning apparatus that is configured to detect media defects such as carbon voids. In some examples, the procedure 1000 may be performed using the circuit of FIG. 3 or the devices described in connection with FIG. 7, 9, or 10. At block 1002, the method receives a plurality (or set) of input signals from an equal plurality (or corresponding set) of optical sensors of the apparatus for detecting the condition of the surface region of the magnetic recording medium. At block 1004, generates a summed output signal based on the set or plurality of input signals using a first circuit that is configured to generate first and second components of the summed output signal, the first component representative of the condition and the second component representative of a power of an optical transmitter of the apparatus. In some examples, the first component includes frequencies above a first (relatively high) threshold frequency (e.g., 1 MHz) and the second component comprises frequencies at or below a second (relatively low) threshold frequency (e.g., 40 Hz). As explained above, the first component may be regarded as comprising AC frequencies, whereas the second component may be regarded as comprising DC frequencies. As noted above, in some aspects, the first and second thresholds may be the same value, e.g., both set to 40 Hz (or other suitable cutoff value that may be used to distinguish between the higher frequency components of the summed output signal that are representative of a particular condition to be detected and the lower frequency components that are representative of the power of the optical transmitter). At block 1006, the method performs dynamic level shifting of the second component of the summed output signal using a second circuit that is coupled to the first circuit and is configured to perform the level shifting based on an offset signal and the set or plurality of input signals, wherein the level shifting is performed to set a slope of the second component as a function of the power of the optical transmitter of the apparatus to a selected slope value. See, for example, the slope 402 of FIG. 4, which is set to maintain the QCD sum voltage between upper and lower limits 406 and 408.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A circuit for use with an apparatus for detecting a condition of a surface region of a magnetic recording medium, the circuit comprising:
   a plurality of input terminals configured to receive a plurality of input signals from a plurality of optical sensors of the apparatus;
   a summing circuit configured to generate a summed output signal from the plurality of input signals, wherein the summed output signal comprises a first component representative of the condition and second component representative of a total power of an optical transmitter of the apparatus; and
   a level shifting circuit configured to receive an offset signal and the plurality of input signals and further configured to provide dynamic level shifting of the second component of the summed output signal based on the offset signal and the plurality of input signals, wherein the level shifting circuit is configured to set a slope of the second component as a function of the power of the optical transmitter of the apparatus to a selected slope value.

2. The circuit of claim 1, wherein the summing circuit comprises:
   a first set of input terminals configured to receive the plurality of input signals, and
   circuitry coupled to the first set of input terminals and configured to generate the summed output signal comprising the first component and the second component.

3. The circuit of claim 2, wherein the plurality of optical sensors of the apparatus comprises four photodiodes, and wherein each input terminal of the first set of input terminals is configured to receive an electrical signal from a corresponding one of the four photodiodes of the apparatus.

4. The circuit of claim 2, wherein the summing circuit further comprises a differential amplifier including a first amp input terminal coupled to each of the first set of input terminals and a second amp input terminal coupled to an output of the level shifting circuit.

5. The circuit of claim 4, wherein the level shifting circuit comprises:
a second set of input terminals configured to receive the plurality of input signals, and
circuitry coupled to the second set of input terminals, to a fixed offset input, and to the summing circuit, and configured to provide the dynamic level shifting of the second component of the summed output signal.

6. The circuit of claim 5, wherein the level shifting circuit further comprises:
a first sub-circuit coupling each of the second set of input terminals to the second amp input terminal; and
a second sub-circuit coupling each of the input terminals of the second set of input terminals to a parallel network comprising:
(i) the fixed offset,
(ii) a low pass capacitor (C), and
(iii) a ground resistor (Rd), wherein each of the components of the parallel network are coupled in parallel to ground.

7. The circuit of claim 6, wherein the first sub-circuit further comprises a plurality of input resistors (Ru) of equal resistance, each coupled between a corresponding one of the second set of input terminals and the second amp input terminal.

8. The circuit of claim 1, wherein the level shifting circuit is configured to set a slope of the second component of the summed output signal as a function of the power of the optical transmitter of the apparatus to the selected slope value.

9. The circuit of claim 1, wherein the level shifting circuit is configured to set a range of values of the second component of the summed output signal to remain within predetermined lower and upper limits throughout a range of power levels of the optical transmitter of the apparatus.

10. The circuit of claim 1, wherein the first component comprises frequencies above a first threshold frequency and the second component comprises frequencies at or below a second threshold frequency, and wherein the first threshold frequency is no less than the second threshold frequency.

11. The circuit of claim 10, wherein the first threshold frequency is 1 MHz and the second threshold frequency is 40 Hz.

12. A test apparatus comprising:
the circuit of claim 1, the optical transmitter, a Quad Channel Detector (QCD), and the plurality of optical sensors, and wherein the circuit is a signal summing component of the QCD.

13. The test apparatus of claim 12,
wherein the optical transmitter comprises a laser configured to direct incident light on the surface region of the magnetic recording medium; and
wherein the plurality of optical sensors is configured to measure reflected light from the surface region and generate the plurality of input signals in accordance with the measured light.

14. A method for processing input signals from an apparatus for detecting a condition of a surface region of a magnetic recording medium, the method comprising:
receiving a plurality of input signals from a plurality of optical sensors of the apparatus;
generating a summed output signal based on the plurality of input signals using a first circuit that is configured to generate first and second components of the summed output signal, the first component representative of the condition and the second component representative of a power of an optical transmitter of the apparatus; and
performing dynamic level shifting of the second component of the summed output signal using a second circuit that is coupled to the first circuit and is configured to perform the level shifting based on an offset signal and the plurality of input signals, wherein the level shifting is performed to set a slope of the second component as a function of the power of the optical transmitter of the apparatus to a selected slope value.

15. The method of claim 14, wherein receiving the plurality of input signals comprises receiving four electrical input signals from four photodiodes.

16. The method of claim 15, wherein generating the summed output signal comprises applying the four electrical input signals to a first input terminal of a differential amplifier that has a second input terminal coupled to an output of the second circuit.

17. The method of claim 16, wherein performing the dynamic level shifting comprises:
applying the four electrical input signals to the second input terminal of the differential amplifier of the first circuit and to a sub-circuit that comprises (i) an offset signal input providing a fixed offset value and (ii) a low pass capacitor (C) and a ground resistor (Rd) that are coupled in parallel to ground.

18. The method of claim 17, further comprising applying the four electrical input signals to four input resistors (Ru) of equal resistance, each of which is coupled to the second input terminal of the differential amplifier of the first circuit.

19. The method of claim 18, wherein the resistances of the input resistors (Ru) and the ground resistor (Rd) and the capacitance of the capacitor (C) are selected to set the slope of the second component of the summed output signal as a function of the power of the optical transmitter of the apparatus to the selected slope value.

20. The method of claim 14, wherein the second circuit is configured to set the slope of the second component of the summed output signal as a function of the power of the optical transmitter of the apparatus to the selected slope value.

21. The method of claim 14, wherein the second circuit is configured to set a range of values of the second component of the summed output signal to remain within predetermined lower and upper limits within a range of power levels of the optical transmitter of the apparatus.

22. The method of claim 14, wherein the condition is a defect in the magnetic recording medium.

23. The method of claim 22, wherein the defect is a carbon void.

24. The method of claim 14, wherein the first component comprises frequencies above a first threshold frequency and the second component comprises frequencies at or below a second threshold frequency, and wherein the first threshold frequency is no less than the second threshold frequency.

25. The method of claim 24, wherein the first threshold frequency is 1 MHz and the second threshold frequency is 40 Hz.

26. An apparatus for detecting a condition of a surface region of a magnetic recording medium, the apparatus comprising:

means for receiving a plurality of input signals from a plurality of optical sensors of a magnetic recording media scanning device;

means for generating a summed output signal based on the plurality of input signals, the summed output signal having first and second components, the first component representative of the condition and the second component representative of a power of an optical transmitter of the apparatus; and means for level shifting the second component of the summed output signal based on an offset signal and the plurality of input signals, wherein the level shifting is performed to set a slope of the second component as a function of the power of the optical transmitter of the apparatus to a selected slope value.

* * * * *